United States Patent
Tokizaki

(10) Patent No.: US 9,712,018 B2
(45) Date of Patent: Jul. 18, 2017

(54) WIPER MOTOR

(75) Inventor: Teppei Tokizaki, Kiryu (JP)

(73) Assignee: Mitsuba Corporation, Kiryu-shi, Gunma (JP)

(*) Notice: Subject to any disclaimer, the term of this patent is extended or adjusted under 35 U.S.C. 154(b) by 208 days.

(21) Appl. No.: 13/819,798

(22) PCT Filed: Aug. 24, 2011

(86) PCT No.: PCT/JP2011/069069
§ 371 (c)(1),
(2), (4) Date: Feb. 28, 2013

(87) PCT Pub. No.: WO2012/029608
PCT Pub. Date: Mar. 8, 2012

(65) Prior Publication Data
US 2013/0154412 A1 Jun. 20, 2013

(30) Foreign Application Priority Data
Sep. 2, 2010 (JP) ................................. 2010-196536

(51) Int. Cl.
*H02K 7/116* (2006.01)
*B60S 1/06* (2006.01)
(Continued)

(52) U.S. Cl.
CPC ............ *H02K 7/1166* (2013.01); *B60S 1/166* (2013.01); *B60S 1/26* (2013.01); *B60S 1/583* (2013.01);
(Continued)

(58) Field of Classification Search
CPC .... B60S 1/0486; B60S 1/3801; B60S 1/0452; B60S 1/166; B60S 1/583; H02K 7/116;
(Continued)

(56) References Cited

U.S. PATENT DOCUMENTS 5,566,577 A * 10/1996 Klar .................................. 74/42
5,841,249 A * 11/1998 Zimmer et al. ................ 318/10
(Continued)

FOREIGN PATENT DOCUMENTS

CN 200113662 * 9/2008
JP 2000-341906 A 12/2000
(Continued)

OTHER PUBLICATIONS

Machine translation for JP2007189759.*
(Continued)

*Primary Examiner* — Joshua Benitez Rosario
*Assistant Examiner* — Ahmed Elnakib
(74) *Attorney, Agent, or Firm* — McCormick, Paulding & Huber LLP

(57) ABSTRACT

A wiper motor includes a reduction mechanism (26) contained in a reduction mechanism containing chamber (27) of a gear frame (21) and configured to reduce and transmit a rotation to a worm wheel (35); and a motion conversion mechanism (29) contained in a motion conversion mechanism containing chamber (30) of the gear frame (21) and configured to convert and output a rocking motion to an output shaft (28). A support surface (37) set up flush with the other end surface (35b) of the worm wheel (35) in the axial direction rotatably contained in the reduction mechanism containing chamber (27) is formed on the inner surface of the bottom wall (30a) of the motion conversion mechanism containing chamber (30). The support surface (37) is formed over the entire area facing a pinion gear (40) and the motion conversion member (41) on the bottom wall (30a) of the motion conversion mechanism containing chamber (30).

4 Claims, 5 Drawing Sheets

(51) Int. Cl.
*B60S 1/16* (2006.01)
*B60S 1/26* (2006.01)
*B60S 1/58* (2006.01)
*F16H 57/039* (2012.01)
*F16H 21/40* (2006.01)
*H02K 7/06* (2006.01)
*H02K 7/08* (2006.01)

(52) U.S. Cl.
CPC ............ *F16H 57/039* (2013.01); *F16H 21/40* (2013.01); *H02K 7/06* (2013.01); *H02K 7/081* (2013.01)

(58) Field of Classification Search
CPC ...... H02K 7/1166; H02K 5/225; H02K 7/145; H02K 7/081; H02K 7/06; F16H 57/039; F16H 21/40
USPC .......... 310/83, 99, 46; 74/425, 42, 395, 392, 74/600; 192/148, 139; 15/250.17, 15/250.16, 250.3, 250.12, 250.13; 318/443, DIG. 2
See application file for complete search history.

(56) References Cited

U.S. PATENT DOCUMENTS 5,907,885 A * 6/1999 Tilli et al. .................. 15/250.16
7,568,257 B2 * 8/2009 Yagi et al. ................... 15/250.3
2006/0059646 A1 * 3/2006 Bendo .......................... 15/250.3

FOREIGN PATENT DOCUMENTS

| JP | 2006-88777 A |   | 4/2006 |
| JP | 2007-189759 | * | 7/2007 |
| JP | 2007-189759 A |   | 7/2007 |
| JP | 2007189759 | * | 7/2007 |
| JP | 2007189759 A | * | 7/2007 |

OTHER PUBLICATIONS

Machine translation for JP 2007189759.*
Machine translation for CN 200113662.*
Machine translation for JP 2007-189759.*
JP 2007-189,759; Ota shigeki; Jul. 2007; Japan.*
English translation of JP 2000-341906; Dec. 2000; Sasaki Yoshiaki; Japan.*
English translation of JP 2007-189759; Jul. 2007; Shigeki Otai; Japan.*
PCT Search Report for PCT U.S. Serial No. PCT/JP2011/069069 dated Oct. 20, 2011.

* cited by examiner

WIPER MOTOR

CROSS-REFERENCE TO RELATED APPLICATION

This application is entitled to the benefit of and incorporates by reference essential subject matter disclosed in International Patent Application No. PCT/JP2011/069069 filed on Aug. 24, 2011 and Japanese Patent Application No. JP2010-0196536 filed on Sep. 2, 2010.

TECHNICAL FIELD OF THE INVENTION

The present invention relates to a wiper motor for driving a wiper member mounted on an automobile and so on, particularly, a wiper motor comprising a motion conversion mechanism converting a rotary motion into a swinging motion and transmitting the swinging motion.

BACKGROUND OF THE INVENTION

As a drive source for driving a wiper member, a wiper motor is used in a rear wiper device for wiping a rear window glass mounted on a vehicle such as an automobile. The wiper motor has an electric motor such as a brushed motor. A speed reduction mechanism and a motion conversion mechanism are contained in a gear case mounted on the electric motor. The speed reduction mechanism comprises a worm rotated by the electric motor and a worm wheel meshing with the worm. The rotation of the electric motor is reduced by the speed reduction mechanism and then transmitted to the worm wheel. A rotary motion of the worm wheel is converted into a swinging motion by the motion conversion mechanism and transmitted to an output shaft. The wiper member attached to a distal end of the output shaft is swung back and forth within a predetermined angular range. Such wiper motors are described, for example, in JP 2000-341906 and JP2006-88777.

As a wiper motor, there are a narrow-angle type (link type) with a narrow range of swing of the wiper member and a wide-angle type (differential gear) with a wide range of swing of the wiper member. The motion conversion mechanism mounted on the wiper motor of the narrow-angle type has a pivoting lever fixed to a proximal end of the output shaft, and a connecting rod converting the rotary motion of the worm wheel into the swinging motion and transmitting the swinging motion to the pivoting lever. The connecting rod is rotatably connected to the worm wheel at a position deviating radially from an axial center of the worm wheel and another end of the connecting rod is rotatable connected to the pivoting lever.

On the other hand, the motion conversion mechanism mounted on the wiper motor of the wide-angle type has a pinion gear fixed to the proximal end of the output shaft and a motion conversion member converting the rotary motion of the worm wheel into the swinging motion and transmitting the swinging motion to the pinion gear. One end of the motion conversion member is rotatably connected to the worm wheel at a position deviating radially from an axial center of the worm wheel and another end is a sector gear portion meshing with the pinion gear. A retaining plate swingably connecting the output shaft and a gear shaft set at an axial center of the sector gear portion is set up and retains meshing of the pinion gear and the sector gear portion.

Since the wiper motor of the wide-angle type has many parts due to the structure thereof, there is a problem that the degree of play in a rotational direction of the output shaft is larger than the wiper motor of the narrow-angle type. The causes of the play in the rotational direction of the output shaft include occurrence of clearance in a sliding portion of each member, backlash in meshing of the pinion gear and the sector gear portion, a deviation in meshing of the pinion gear and the sector gear portion due to play in a thrust direction of each member and the like. Particularly, in conventional wiper motors, since a contact area between a gear frame or the worm wheel and each member of the motion conversion mechanism is not designed to be fully large and each member is easily tilted, it becomes a factor that the play in the rotational direction of the output shaft increases.

For example, in the wiper motor described in JP2006-88777, since contact areas between the gear frame (gear case) and the retaining plate (swinging plate) and between the worm wheel and the motion conversion member (power conversion member) are not designed to be fully large, tilting of the motion conversion member, the retaining plate, the pinion gear (output gear) and the like cannot sufficiently be suppressed. Accordingly, when each member is tilted by reaction force by meshing between the pinion gear and the sector gear portion or the like, the meshing between the pinion gear and the sector gear deviates and the play in the rotational direction of the output shaft increases.

SUMMARY OF THE INVENTION

An object of the present invention is to suppress the play in the rotational direction of the output shaft.

The wiper motor of the present invention comprises an electric motor and a motion conversion mechanism converting a rotary motion of the electric motor into a swinging motion and transmitting the swinging motion to an output shaft, comprising: a speed reduction mechanism comprising a worm rotated by the electric motor, and a worm wheel meshing with the worm, the speed reduction mechanism reducing the speed of rotation of the electric motor and transmitting the rotation to the motion conversion mechanism; a gear frame with a bottom attached to the electric motor, wherein a speed reduction mechanism chamber storing the speed reduction mechanism and a motion conversion mechanism chamber storing the motion conversion mechanism is formed, and wherein a supporting face set up on flush with an axial end face of the worm wheel rotatably contained in the speed reduction mechanism chamber is formed on a bottom wall of the motion conversion mechanism chamber; a gear cover closing an opening of the gear frame; a pinion gear fixed to a proximal end of the output shaft, slidably struck on the supporting face of the gear frame, and integrally rotating with the output shaft; a motion conversion member comprising a sector gear portion meshing with the pinion gear, rotatably connected to the worm wheel at a position deviating radially from an axial center of the worm wheel, and slidably struck on the supporting face of the gear frame and the axial end face of the worm wheel; and a retaining plate connecting a gear shaft provided at an axial center of the sector gear portion and the output shaft swingably to each other, wherein the supporting face of the gear frame is formed over an entire area facing the pinion gear and the motion conversion member of the bottom wall of the motion conversion mechanism chamber.

In the wiper motor of the present invention, the retaining plate is set up nearer to the opening of the gear frame than the pinion gear and the motion conversion member, and slidably struck to the pinion gear and the motion conversion member at a abutment surface parallel to the supporting face.

The wiper motor of the present invention further comprises a connecting shaft rotatably connecting the worm wheel and the motion conversion member at a position deviating radially from the axial center of the worm wheel, and being attached a sliding contact member slidably struck on an inner face of the gear cover at a proximal end of the connecting shaft, the gear shaft, and the output shaft.

In the present invention, since the axial end face of the worm wheel flushes with and the supporting face of the gear frame are set, and the supporting face is formed over the entire area of the bottom wall of the motion conversion mechanism chamber facing the pinion gear and the motion conversion member, a contact area between the gear frame or the worm wheel and each member of the motion conversion mechanism can be designed to be large. This suppresses play in a thrust direction of each member and tilting of each member, and thus the engagement between the pinion gear and the sector gear portion is prevented from deviating so that play in a rotational direction of the output shaft can be suppressed.

BRIEF DESCRIPTIONS OF THE DRAWINGS

DESCRIPTIONS OF THE PREFERRED EMBODIMENTS

Figure 1:
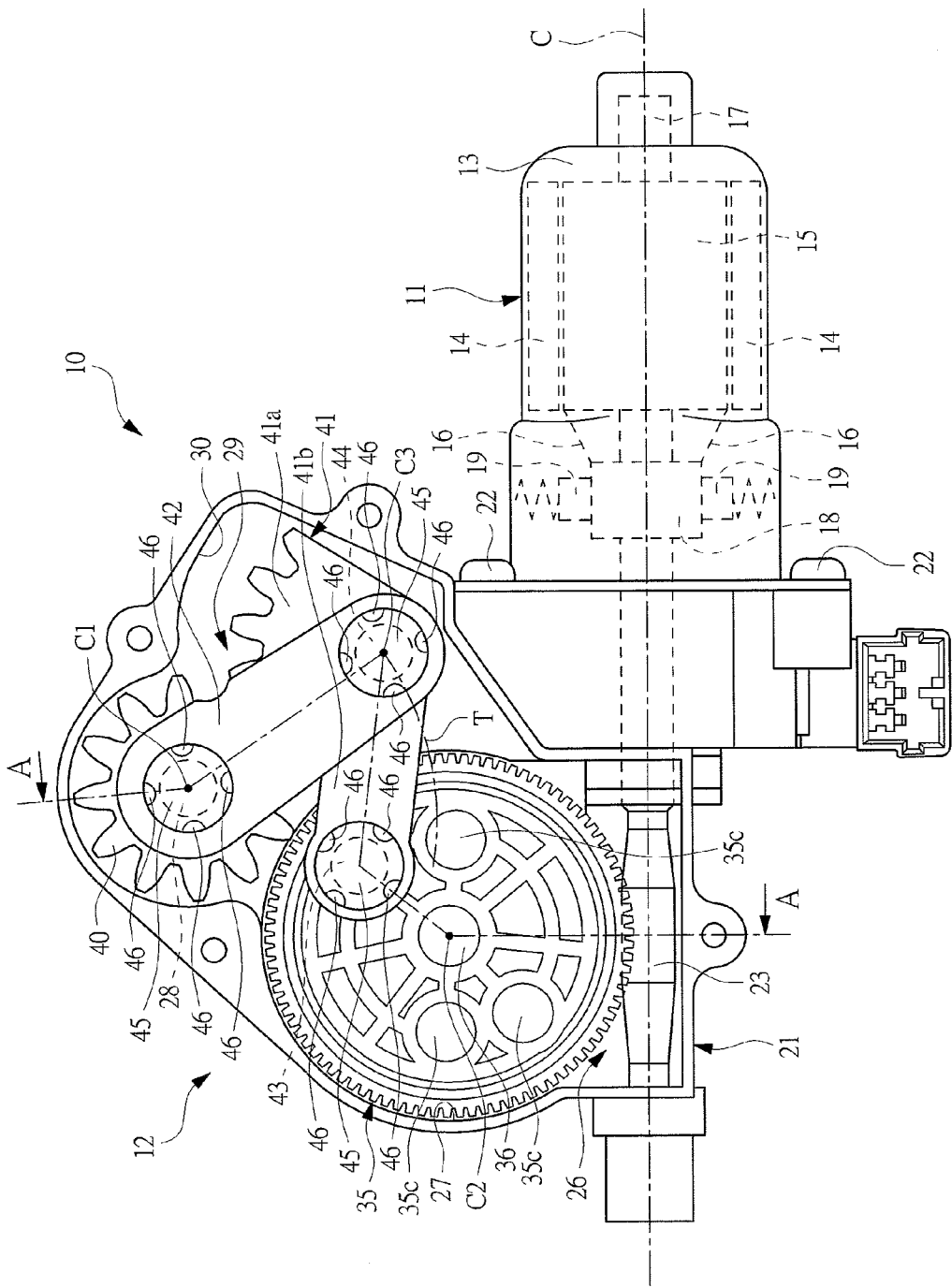
FIG. 1 is a diagram showing a wiper motor of the embodiment of the present invention.

Hereinafter, embodiments of the present invention are described in detail on the basis of drawings. A wiper motor 10 shown in FIG. 1 is used as a drive source of a rear wiper device for wiping a rear window glass mounted on a vehicle such as an automobile. This wiper motor 10 has a motor body (electric motor) 11, and a gear unit portion 12 comprising a motion conversion mechanism converting a rotary motion of the motor body 11 into a swinging motion and transmitting the swinging motion.

The motor body 11 is a brushed DC motor, and comprises a motor case (yoke) 13 formed by pressing a thin steel sheet or the like to a cylinder with a bottom. A plurality of arc-shape permanent magnets 14 magnetized to the N pole and the S pole in a radially inward direction, respectively, face each other and fastened to an inner periphery of motor case 13. An armature 15 facing each permanent magnet 14 via a micro space is rotatably contained inside motor case 13, and a plurality of coils 16 are wound around the armature 15. A motor shaft 17 is fixed by penetrating to a center of rotation of the armature 15.

A cylindrical commutator 18 is fixed to the motor shaft 17 adjacent to the armature 15. An end portion of each coil 16 is electrically connected to the commutator 18. A pair of brushes 19 are in sliding contact with an outer periphery of the commutator 18, respectively. When a drive current is supplied to coils 16 via each brush 19 and the commutator 18, an electromagnetic force torque is generated in the armature 15 in rotational direction, and then, the motor shaft 17 is rotatably driven at a predetermined rotational speed.

A gear frame 21 of the gear unit portion 12 is attached to the motor body 11 on an opening side of the motor case 13.

The gear frame 21 is opened to the motor case 13. The gear frame 21 is fixed to the motor case 13 by fastening screws 22 with striking each opening end each other. The motor shaft 17 is inserted inside the gear frame 21 on the other axial end side thereof, and a worm 23 comprising a helical teeth portion is integrally formed with an outer periphery on the other axial end side of the motor shaft 17.

Figure 2:
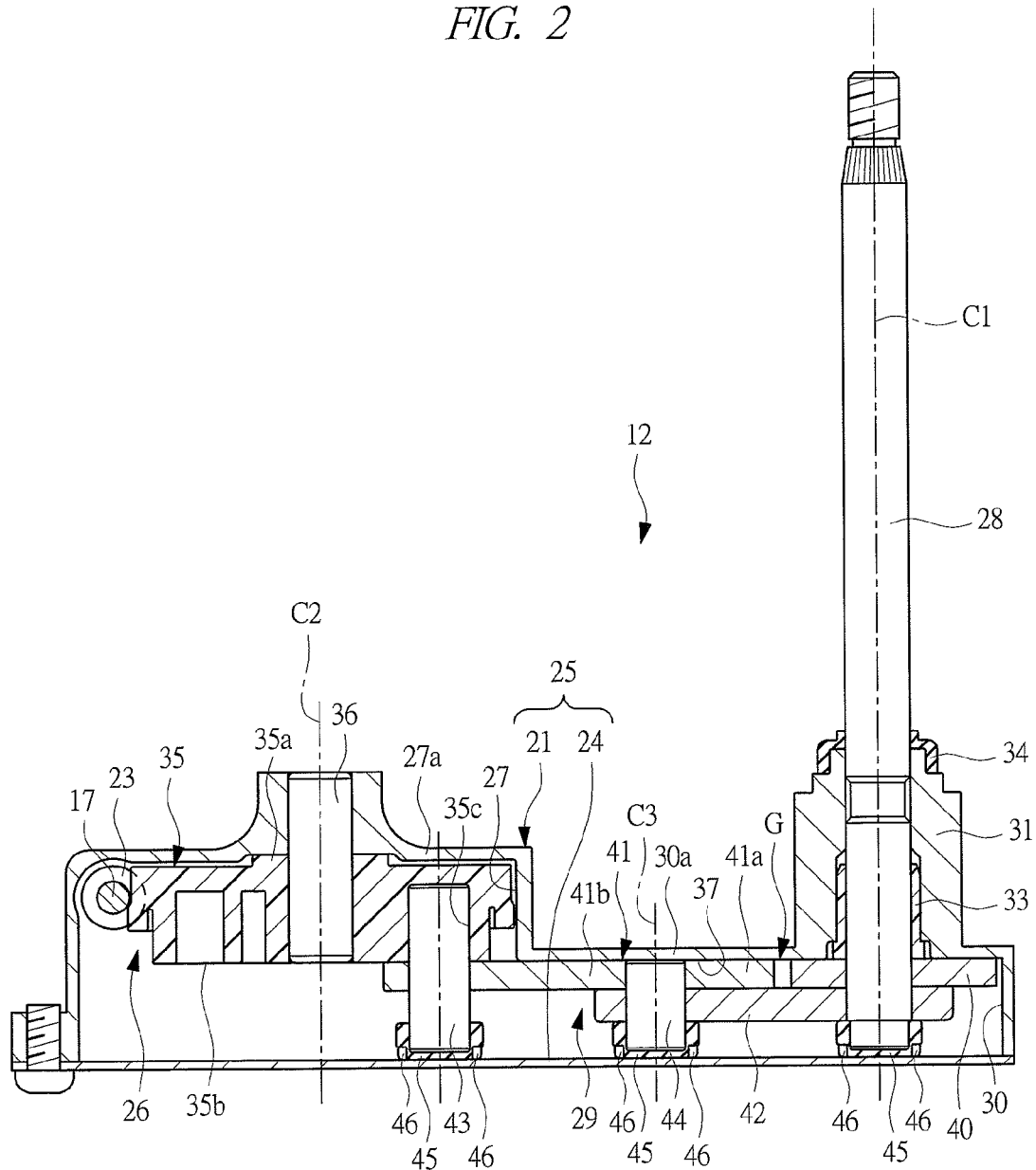
FIG. 2 is a cross-sectional diagram along the line A-A in FIG. 1.

As shown in FIG. 2, the gear frame 21 is formed by aluminum die casting at a bottom opening on the side perpendicular to the axial direction of the motor shaft 17, and forms a gear case 25 with a gear cover 24 closing an opening of the gear frame 21. A speed reduction mechanism 26 which reduces the speed of rotation of the motor shaft 17 and transmits the rotation and a motion conversion mechanism 29 which converts a rotary motion of the speed reduction mechanism 26 into a swinging motion and transmits the swinging motion to an output shaft 28 are contained in the gear case 21. A speed reduction mechanism chamber 27 containing the speed reduction mechanism 26 and a motion conversion mechanism chamber 30 containing the motion conversion mechanism 29 is also formed in the gear case 21. The motion conversion mechanism chamber 30 is formed closer to the gear cover 24 than the speed reduction mechanism chamber 27, and communicates with the speed reduction mechanism chamber 27, and comprises a bottom wall 30a extending to a plane parallel to a bottom wall 27a of the speed reduction mechanism chamber 27. The bottom wall 30a of the motion conversion mechanism chamber 30 is set up closer to the gear cover 24 than the bottom wall 27a of the speed reduction mechanism chamber 27. The bottom wall 30a of the motion conversion mechanism chamber 30 and the bottom wall 27a of the speed reduction mechanism chamber 27 are formed parallel to each other on different planes.

FIG. 1 is a diagram of the wiper motor 10 without the gear cover 24 and shows a structure inside the gear frame 21. The gear cover 24 is formed in a predetermined shape by a steel sheet or the like. The wiper motor 10 is fixed to a vehicle body by a bracket portion (not shown) integrated with the gear cover 24. In this embodiment, the gear frame 21 formed so as to have a bottom by aluminum die casting is shown, but not limited, and the gear frame 21 may be formed by resin or other materials.

The output shaft 28 is formed of a round bar made of metal such as steel iron. The axial direction of the output shaft 28 faces an axial direction perpendicular to the axial direction of the motor shaft 17, that is, perpendicular to the bottom wall 30a of the motion conversion mechanism chamber 30. The output shaft 28 has a proximal end contained in the motion conversion mechanism chamber 30, a distal end extending outside of the gear frame 21, and is set up so as to pass through the bottom wall 30a of the motion conversion mechanism chamber 30. A substantially-cylindrical shaft retaining portion 31 projecting outside of the gear frame 21 along an outer periphery of the output shaft 28 is integrally formed at the bottom wall 30a of the motion conversion mechanism chamber 30. The output shaft 28 is inserted to the shaft retaining portion 31 and rotatably supported by the shaft retaining portion 31. The distal end of the output shaft 28 projects from the rear window glass outward from the vehicle body, and a wiper member (not shown) for wiping an outer face of the rear window glass is fixed at the distal end of the output shaft 28.

A plastic bearing member 33 is set up between an inner periphery of the shaft retaining portion 31 and the outer periphery of the output shaft 28. The output shaft 28 is rotatably supported on the shaft retaining portion 31 via the shaft bearing member 33. A seal member 34 is attached to a distal end of the shaft retaining portion 31 to prevent rainwater, dusts, and the like from entering the gear frame 21.

The speed reduction mechanism 26 has the worm 23 rotated by the motor body 11 and a worm wheel 35 meshing with the worm 23. The worm wheel 35 is formed into a substantially disk-like shape by injection molding of a resin material, and an outer periphery thereof comprises a teeth portion meshing with the worm 23. A rotary shaft 36 which is fixed to the bottom wall 27a of the speed reduction mechanism chamber 27 and extends parallel to the output shaft 28 is inserted into an axial center of the worm wheel 35. The worm wheel 35 is rotatably supported on the rotary shaft 36 within the speed reduction mechanism chamber 27. The speed reduction mechanism 26 comprising the worm 23 and the worm wheel 35 reduces the speed of rotation of the motor body 11 and transmits the rotation to the worm wheel 35.

A cylindrical boss portion 35a projecting toward the bottom wall 27a along an outer periphery of the rotary shaft 36 is set up on an axial end face of the worm wheel 35. The worm wheel 35 is slidably abut on an inner face of the bottom wall 27a at the boss portion 35a. An axial dimension of this worm wheel 35 is substantially equal to a depth dimension of the speed reduction mechanism chamber 27. The other axial end face 35b of the worm wheel 35 is flush with a supporting face 37 formed by an inner face of the bottom wall 30a of the motion conversion mechanism chamber 30.

The motion conversion mechanism 29 has a pinion gear 40 fixed on the proximal end of the output shaft 28, a motion conversion member 41 converting a rotary motion of the worm wheel 35 into a swinging motion and transmitting the swinging motion to the pinion gear 40, and a retaining plate 42 swingably connecting the pinion gear 40 and the motion conversion member 41. The motion conversion member 41 comprises a sector gear portion 41a meshing with the pinion gear 40 and an arm portion 41b connected to the worm wheel 35 and is formed to a flat-plate-like shape from a metal material such as a steel sheet.

As shown in FIG. 2, the motion conversion member 41 is set up nearer to the gear cover 24 than the worm wheel 35 and extends parallel to the supporting face 37 of the gear frame 21 between the pinion gear 40 and the worm wheel 35. The motion conversion member 41 on the side of the bottom walls 27a and 30a are slidably abut on the other axial end face 35b of the worm wheel 35 and the supporting face 37 of the gear frame 21. A connecting shaft 43 rotatably inserted to any one of a plurality of connecting holes 35c formed in the worm wheel 35 is fixed to an end portion of the arm portion 41b of the motion conversion member 41. That is, the motion conversion member 41 is rotatably connected to the worm wheel 35 by the connecting shaft 43 set up at a position radially deviated from an axial center C2 of the worm wheel 35. The pinion gear 40 is a spur gear and integrally rotated with the output shaft 28 by being fixed to the proximal end of the output shaft 28. The pinion gear 40 is flush with the motion conversion member 41 and meshes with the sector gear portion 41a comprising a substantially-fan-like spur gear, and an end face on the bottom wall 30a thereof is slidably abut to the supporting face 37 of the gear frame 21.

The retaining plate 42 is formed to a flat-plate-like shape from a metal material such as a steel sheet. The retaining plate 42 is set up nearer to the gear cover 24 than the pinion gear 40 and the motion conversion member 41 and extends parallel to the supporting face 37 of the gear frame 21 between the pinion gear 40 and the sector gear portion 41a. A side face of the retaining plate 42 on the side of the bottom walls 27a and 30 is slidably abut on an end face of the pinion gear 40 on the side of the gear cover 24 and a side face of the motion conversion member 41 on the side of the gear cover 24 at abutting face parallel to the supporting face 37 of the gear frame 21.

A gear shaft 44 extending parallel to the output shaft 28 and the connecting shaft 43 is rotatably inserted at one end portion of the retaining plate 42 and is fixed to an axial center of the sector gear portion 41a. A distal end face of the gear shaft 44 is slidably abut on the supporting face 37 of the gear frame 21 or the other axial end face 35b of the worm wheel 35. On the other hand, the output shaft 28 is rotatably inserted to the other end portion of the retaining plate 42. The retaining plate 42 swingably connects the gear shaft 44 to the output shaft 28, and the meshing state of the pinion gear 40 is retained to the sector gear portion 41a. That is, support of a meshing portion G of the pinion gear 40 and the sector gear portion 41a between the supporting face 37 of the gear frame 21 and the retaining plate 42 prevents the meshing between the pinion gear 40 and the sector gear portion 41a from deviating.

Due to the motion conversion mechanism 29 with a differential gear structure, when the worm wheel 35 rotates, the connecting shaft 43 fixed to the arm portion 41b of the motion conversion member 41 rotates around the rotary shaft 36 together with the worm wheel 35. Then, the gear shaft 44 fixed to the sector gear portion 41a of the motion conversion member 41 is swung around the output shaft 28, and the output shaft 28 is swung back and forth within a predetermined angular range by meshing between the sector gear portion 41a and the pinion gear 40. That is, a rotary motion of the worm wheel 35 is converted into a swinging motion and transmitted to the output shaft 28 by the motion conversion mechanism 29 and the wiper member is swingably driven within a predetermined swinging range, that is, between a preset stop position and reverse position.

Sliding contact members 45 slidably abut on an inner face of the gear cover 24 are loaded to proximal ends of the output shaft 28, the connecting shaft 43, and the gear shaft 44, respectively. The proximal end faces of the respective shafts 28, 43, and 44 are slidably abut on the inner face of the gear cover 24 via the sliding contact members 45. The sliding contact members 45 are formed to a cap-like shape by an elastic material elastically deformable in the axial directions of the respective shafts 28, 43, and 44. The sliding contact members 45 loaded to the respective shafts 28, 43, and 44 are incorporated with axially compressed between the proximal end faces of the respective shafts 28, 43, and 44 and the inner face of the gear cover 24, and elastic force by the sliding contact member 45 acts on the respective shafts 28, 43, and 44 axially toward the bottom walls 27a and 30a.

The sliding contact members 45 loaded to the connecting shaft 43 and the gear shaft 44, respectively, are incorporated with axially compressed between a side face of the retaining plate 42 on the side of the gear cover 24 and the inner face of the gear cover 24, and elastic force by the sliding contact members 45 act on both end portions of the retaining plate 42 axially toward the bottom walls 27a and 30a. Further, the end face of the pinion gear 40 on the side of the gear cover 24 and the side face of the sector gear portion 41a on the side of the gear cover 24 are slidably abut on the inner face of the gear cover 24 via the retaining plate 42 and the sliding contact member 45.

By the elastic force of the sliding contact members 45, each member contained in the gear frame 21, that is, each member of the speed reduction mechanism 26 or the motion conversion mechanism 29 is biased toward the side of bottom walls 27a, 30a of the gear frame 21, and pressed axially between the bottom walls 27a, 30a and the gear cover 24. Since this axial movement of each member contained in the gear frame 21 is strongly restriction by it and axial play is suppresses, it prevents each member within the gear frame 21 from unsteady.

As shown in FIG. 1, a plurality of grease grooves 46 are formed at the respective sliding contact members 45 abutting to the inner face of the gear cover 24. Four grease grooves 46 with a substantially semicircular shape opened radially outward and to the side of the gear cover 24 are set up at equal intervals (intervals of about 90°) along an outer circumferential portion of the sliding contact member 45. Grease (not shown) is applied to the inner face of the gear cover 24 so that the sliding contact member 45 smoothly slides on the gear cover 24, and retained by the grease grooves 46 as grease pooling grooves formed in each of sliding contact members 45.

The position of the output shaft 28 is set up such that an axial center C1 of the output shaft 28 is set up at a position nearer to the motor case 13 in the axial direction of the motor shaft 17 than the axial center C2 of the worm wheel 35, and farther from an axis C of the motor shaft 17 than the axial center C2 of the worm wheel 35. That is, when the wiper motor 10 is set up on the vehicle body with the axial direction of the motor shaft 17 made horizontal, the position of the output shaft 28 is set up such that the output shaft 28 is preferably set up at a higher level on the vehicle than the motor body 11 and that projection of the motor case 13 to one side of the horizontal direction is restricted to the position of the output shaft 28. This improves layout properties of the wiper motor 10 and achieves downsizing of the wiper motor 10.

Figure 3:
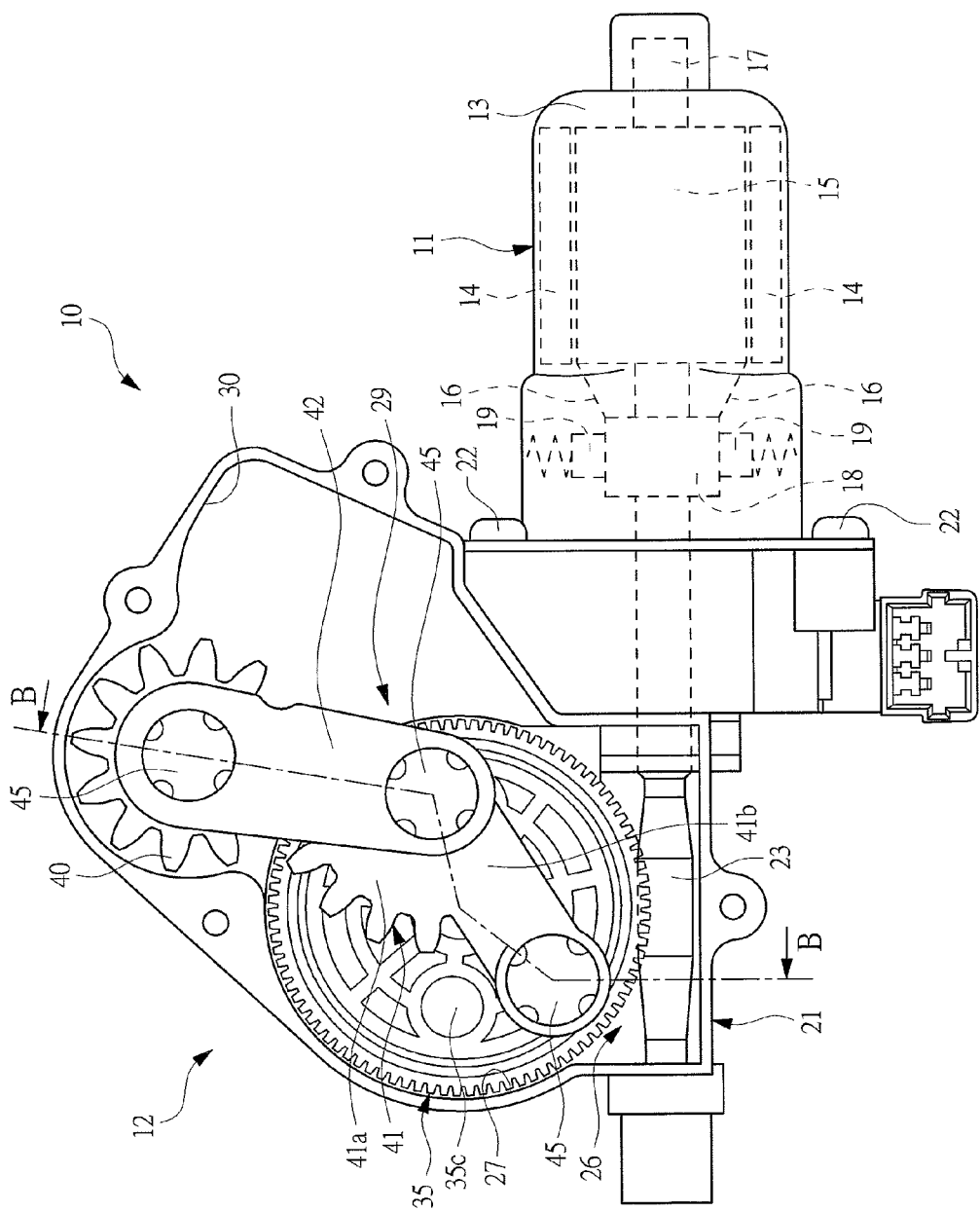
FIG. 3 is a diagram showing a wiper motor based on a reverse position.
Figure 4:
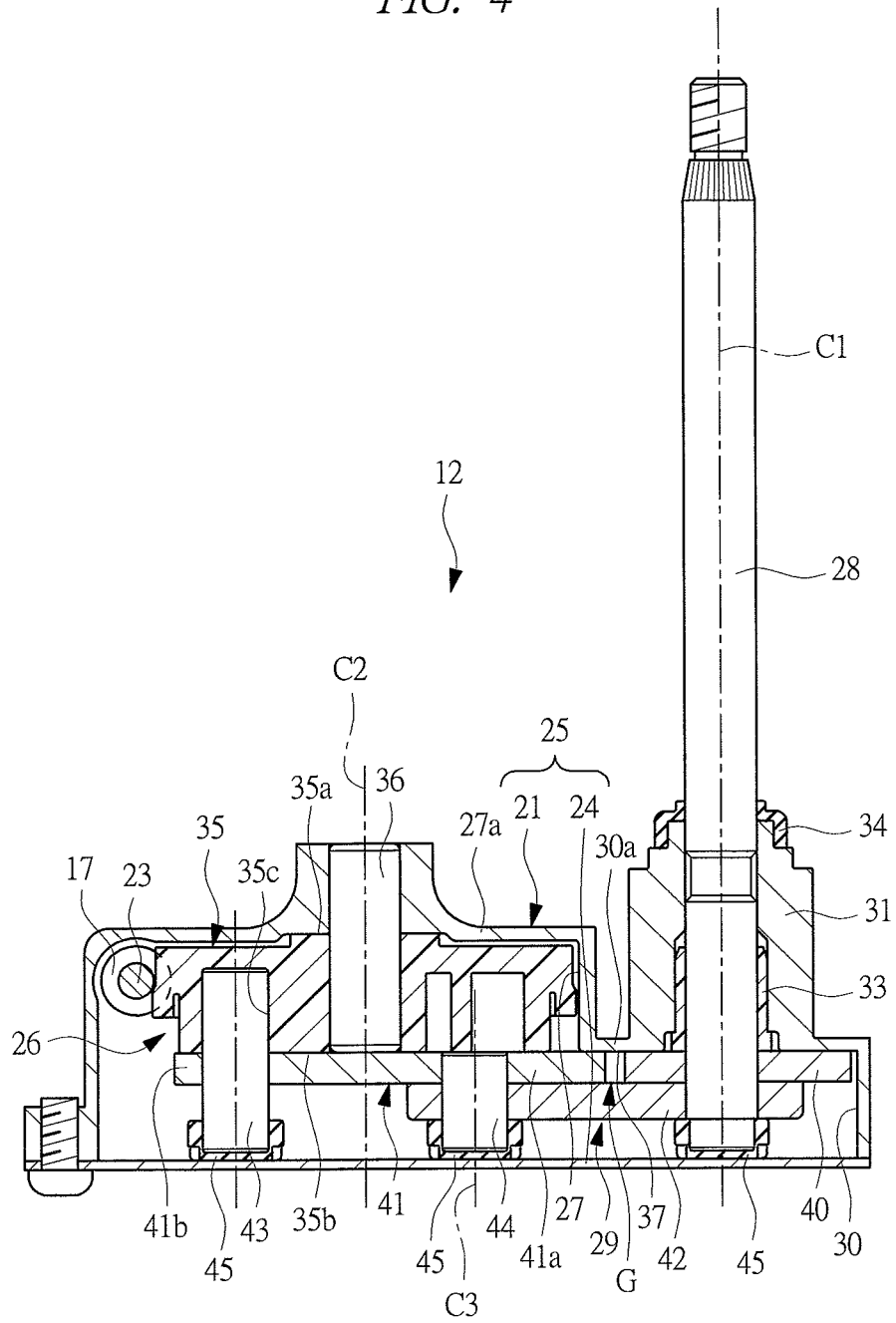
FIG. 4 is a cross-sectional diagram along the line B-B in FIG. 3.
Figure 5:
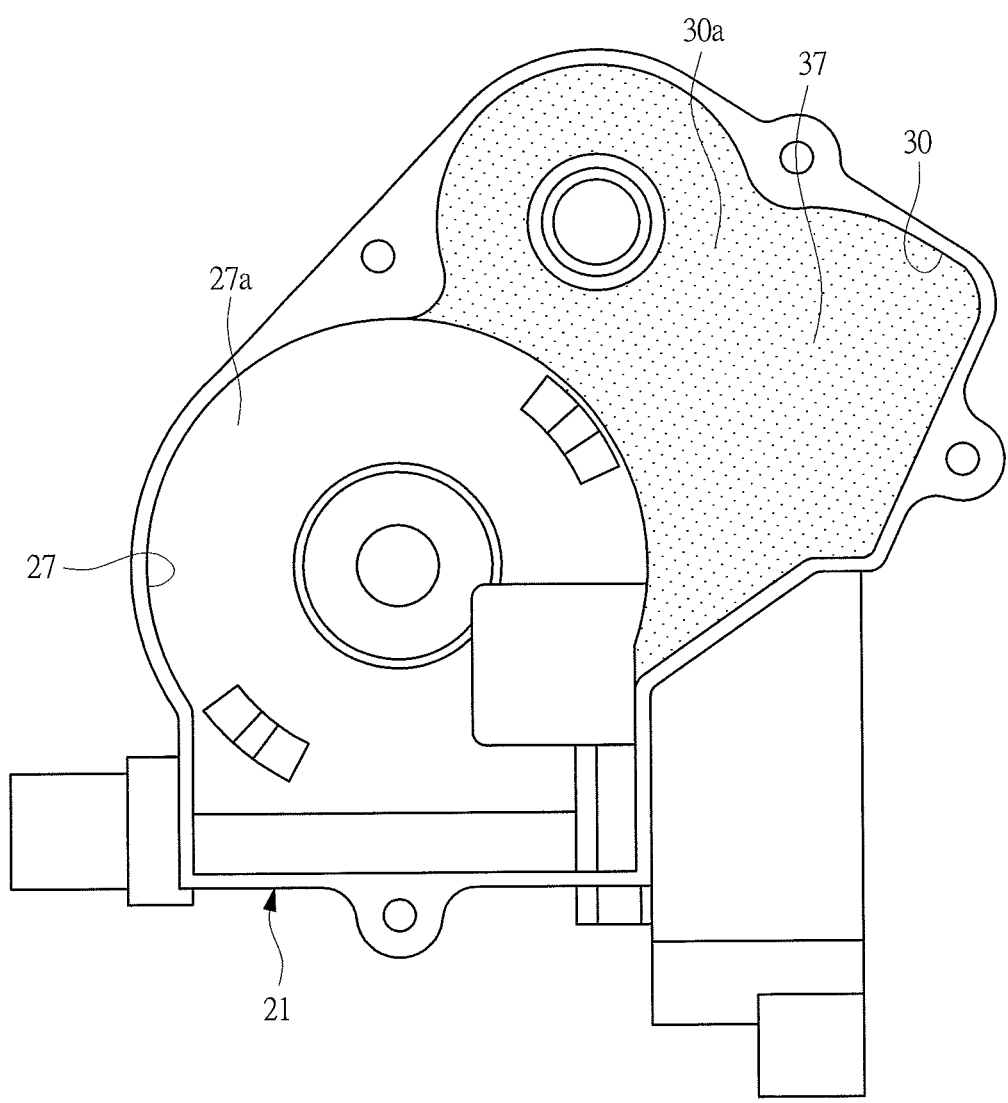
FIG. 5 is a diagram showing inside a gear frame.

Next, the layout of the motion conversion mechanism 29 at the stop position and the reverse position is explained. FIGS. 1 and 2 show the wiper motor 10 when the wiper member is at the stop position and FIGS. 3 and 4 show the wiper motor 10 when the wiper member is at the reverse position. FIG. 3 is a diagram showing a wiper motor at reverse position and FIG. 4 is a cross-sectional diagram along the line B-B in FIG. 3. FIG. 5 is a diagram showing inside a gear frame.

As shown in FIG. 1 and FIG. 2, when the wiper member is at the stop position, the gear shaft 44 is located radially outside the worm wheel 35, and the sector gear portion 41a of the motion conversion member 41 is placed opposite the bottom wall 30a of the motion conversion mechanism chamber 30. In the motion conversion member 41, the sector gear portion 41a is slidably abut to the supporting face 37 of the gear frame 21, the arm portion 41b thereof is slidably abut to the other axial end face 35b of the worm wheel 35, and the meshing portion G between the pinion gear 40 and the sector gear portion 41a is supported between the supporting face 37 of the gear frame 21 and the retaining plate 42.

On the other hand, as shown in FIG. 3 and FIG. 4, when the wiper member is at the reverse position, the gear shaft 44 is located radially inside the worm wheel 35, and the sector gear portion 41a of the motion conversion member 41 is placed opposite the worm wheel 35. In the motion conversion member 41, the sector gear portion 41a and the arm portion 41b are slidably abut on the other axial end face 35b of the worm wheel 35, and the meshing portion G between the pinion gear 40 and the sector gear portion 41a is supported between the supporting face 37 of the gear frame 21 and the retaining plate 42.

When the wiper member is driven between the stop position and the reverse position, an axial center C3 of the gear shaft 44 is moved along a movement route T shown in FIG. 1, and the sector gear portion 41a of the motion conversion member 41 is swung around the axial center C1 of the output shaft 28. At this time, since the supporting face 37 of the gear frame 21 is flush with the other axial end face 35b of the worm wheel 35, the motion conversion member 41 is slid with abut on the supporting face 37 of the gear frame 21 and the other axial end face 35b of the worm wheel 35. This secures a large area of contact between the motion conversion member 41 and the supporting face 37 of the gear frame 21 and a large area of contact between the motion conversion member 41 and the other axial end face 35b of the worm wheel 35. Therefore, occurrence of tilting of the motion conversion member 41 or occurrence of axial play of the motion conversion member 41 can be suppressed. Additionally, since the gear shaft 44 is slid with abut on the other axial end face 35b of the worm wheel 35 or the supporting face 37 of the gear frame 21, occurrence of axial play of the gear shaft 44 can be suppressed.

Furthermore, as shown in FIG. 5, the supporting face 37 of the gear frame 21 is formed over an entire area (dotted area in FIG. 5) of the bottom wall 30a of the motion conversion mechanism chamber 3 facing the pinion gear 40 and the motion conversion member 41. That is, the pinion gear 40 and the motion conversion member 41 are slidably abut on the supporting face 37 over an entire area facing the bottom wall 30a. This secures a large area of contact between the pinion gear 40 and the supporting face 37 of the gear frame 21 and a large area of contact between the motion conversion member 41 and the supporting face 37 of the gear frame 21. Therefore, occurrence of tilting of the pinion gear 40 and the motion conversion member 41 and occurrence of axial play of the pinion gear 40 and the motion conversion member 41 can be suppressed. Since the meshing portion G between the pinion gear 40 and the sector gear portion 41a is always supported between the gear frame 21 and the retaining plate 42 when the motion conversion member 41 is swung, meshing between the pinion gear 40 and the sector gear portion 41a is prevented from deviating and occurrence of play in the rotational direction of the output shaft 28 is suppressed.

In this manner, since the other axial end face 35b of the worm wheel 35 is flush with the supporting face 37 of the gear frame 21, and the supporting face 37 is formed over the entire area of the bottom wall 30a of the motion conversion mechanism chamber 30 facing the pinion gear 40 and the motion conversion member 41, a large area of contact between the gear frame 21 or the worm wheel 35 and each member of the motion conversion mechanism 29 can be secured. This suppresses play in a thrust direction of each member, and suppresses tilting of each member, and thus prevents the meshing between the pinion gear 40 and the sector gear portion 41a from deviating, thereby being capable of suppressing play in the rotational direction of the output shaft 28. Therefore, occurrence of abnormal noise or abnormal wear due to the play in the rotational direction of the output shaft 28 or decrease in the performance of the wiper motor 10 can be prevented.

The present invention is not limited to the above embodiment, and can be modified variously without departing from the scope of the present invention. For example, in the above embodiment, the example that the sliding contact members 45 with a cap-like shape are loaded to the output shaft 28, the connecting shaft 43, and the gear shaft 44 individually has been shown, but the present invention is not limited to this example. Since a distance between the output shaft 28 and the gear shaft 44 is constant regardless of the drive of the wiper motor 10, it is also possible to integrate the sliding contact members 45 attached individually to the respective shafts 28 and 44 as one piece. Specifically, a cover member (not shown) of a type covering the retaining plate 42 retaining the respective shafts 28 and 44 is set up, and the sliding contact members 45 corresponding to the respective shafts 28 and 44 are integrated with the cover member. In this case, the sliding contact members 45 can be loaded on the respective shafts 28 and 44 at once and the procedure of assembly of the wiper motor 10 can be simplified.

Moreover, a motor body 11 is not limited to the brushed motor and other electric motors such as a brushless motor can be used. The wiper motor 10 of the present invention is not limited to one applied to a rear window of vehicles such as an automobile, and applies to a wiper device applied to airplanes and ships.

A wiper motor is applied to driving a wiper members forming wiper device set up in a vehicle such as an automobile and to wiping window glasses.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper motor comprising an electric motor and a motion conversion mechanism converting a rotary motion of the electric motor into a swinging motion and transmitting the swinging motion to an output shaft, comprising:
    a speed reduction mechanism comprising a worm rotated by the electric motor, and a worm wheel meshing with the worm, the speed reduction mechanism reducing the speed of rotation of the electric motor and transmitting the rotation to the motion conversion mechanism, the worm wheel having an axial end face including: circular parts arranged in a concentric fashion and coaxially aligned with the shaft center of the worm wheel; and radial parts extending in a radial direction of the worm wheel;
    a bottomed gear frame attached to the electric motor, and formed with a speed reduction mechanism chamber storing the speed reduction mechanism and a motion conversion mechanism chamber storing the motion conversion mechanism;
    a supporting face formed on a bottom wall of the motion conversion mechanism chamber, wherein the circular parts and the radial parts are flush with the supporting face;
    a gear cover closing an opening of the gear frame;
    a pinion gear fixed to a proximal end of the output shaft, slidably struck on the supporting face of the gear frame, and integrally rotating with the output shaft;
    a motion conversion member comprising a sector gear portion meshing with the pinion gear, rotatably connected to the worm wheel at a position deviating radially from an axial center of the worm wheel, and slidably struck on the supporting face of the gear frame and the axial end face of the worm wheel; and
    a retaining plate connecting a gear shaft provided at an axial center of the sector gear portion and the output shaft swingably to each other,
    wherein the pinion gear and the motion conversion member are in sliding contact with the supporting face of the gear frame,
    wherein when the gear shaft is within an area defined by an outer periphery of the worm wheel, the circular parts and the radial parts of the worm wheel continuously supports the gear shaft, thereby preventing the gear shaft and the output shaft from being inclined with respect to each other,
    wherein the circular parts include an outermost circular part disposed at a certain distance from the supporting face, and
    wherein the certain distance between the outermost circular part and the supporting face is smaller than a diameter of the gear shaft,
    wherein the wiper motor further comprises a connecting shaft rotatably inserted to a connecting hole formed in the worm wheel, the worm wheel having a near-field region formed so as to surround the connecting hole, the connecting shaft rotatably connecting the worm wheel and the motion conversion member, the connecting hole being disposed at a position deviating radially from the axial center of the worm wheel, a near-field region,
    wherein the near-field region is flush with both the circular parts and the radial parts, and a distance between the near-field region and the supporting face is smaller than a diameter of the gear shaft.

2. The wiper motor according to claim 1, wherein the retaining plate is set up nearer to the opening of the gear frame than the pinion gear and the motion conversion member, and slidably struck to the pinion gear and the motion conversion member at a abutment surface parallel to the supporting face.

3. The wiper motor according to claim 1, further comprising a sliding contact member slidably struck on an inner face of the gear cover at a proximal end of the connecting shaft, the gear shaft, and the output shaft.

4. The wiper motor according to claim 1, wherein
    when the gear shaft is within the area defined by the outer periphery of the worm wheel, one end face of the gear shaft is continuously in contact with the axial end face of the worm wheel.

* * * * *